(12) United States Patent  (10) Patent No.: US 7,019,786 B2
Lee  (45) Date of Patent: Mar. 28, 2006

(54) TV WALL FOR LIQUID CRYSTAL DISPLAYS

(75) Inventor: Hung-Lung Lee, Taoyuan Hsien (TW)

(73) Assignee: Hannstar Display Corp., Taipei (TW)

( * ) Notice: Subject to any disclaimer, the term of this patent is extended or adjusted under 35 U.S.C. 154(b) by 534 days.

(21) Appl. No.: 10/237,878

(22) Filed: Sep. 10, 2002

(65) Prior Publication Data
US 2003/0133037 A1 Jul. 17, 2003

(30) Foreign Application Priority Data
Jan. 15, 2002 (TW) .............................. 91200270 U

(51) Int. Cl.
H04N 5/66 (2006.01)

(52) U.S. Cl. .................. 348/383; 248/186.2; 248/919; 361/681

(58) Field of Classification Search ................ 348/383, 348/825, 836, 794; 345/1.3; 361/681; 248/917–919, 248/922, 245, 122.1, 131, 199, 415, 248, 248/183.2, 186.2, 187.1, 349.1
See application file for complete search history.

(56) References Cited
U.S. PATENT DOCUMENTS

| | | | | |
|---|---|---|---|---|
| 5,130,794 A * | 7/1992 | Ritchey | ....................... | 348/39 |
| 5,715,137 A * | 2/1998 | Choi | ......................... | 361/681 |
| 5,805,117 A * | 9/1998 | Mazurek et al. | ............. | 345/1.3 |
| 6,010,111 A * | 1/2000 | Cho | ....................... | 248/346.06 |
| 6,028,701 A * | 2/2000 | Gulick et al. | ............... | 349/443 |
| 6,262,696 B1 * | 7/2001 | Seraphim et al. | ............. | 345/1.3 |
| 6,370,020 B1 * | 4/2002 | Toukairin | ................... | 361/681 |
| 6,378,830 B1 * | 4/2002 | Lu | .......................... | 248/278.1 |
| 6,477,039 B1 * | 11/2002 | Tajima | ........................ | 361/681 |
| 6,594,078 B1 * | 7/2003 | Clifton et al. | .............. | 359/449 |

* cited by examiner

Primary Examiner—Victor R. Kostak
(74) Attorney, Agent, or Firm—Rabin & Berdo, PC

(57) ABSTRACT

A TV wall. The TV wall includes a frame, a plurality of liquid crystal displays, and a plurality of rotating mounting assemblies. The frame is provided with a plurality of pairs of first rods and second rods facing each other, and each of the first rods is provided with a through hole. The liquid crystal displays are disposed on the frame. Each of the rotating mounting assemblies, connecting the liquid crystal displays with the frame, is provided with a base, a rotating member, and a stopper. The base includes a pin corresponding to the through hole, a first bending portion corresponding to the first rod, and a second bending portion corresponding to the second rod. The pin is inserted into the through hole. The second rod holds the second bending portion. The stopper abuts the second rod. Thus, the base is disposed on the frame.

14 Claims, 19 Drawing Sheets

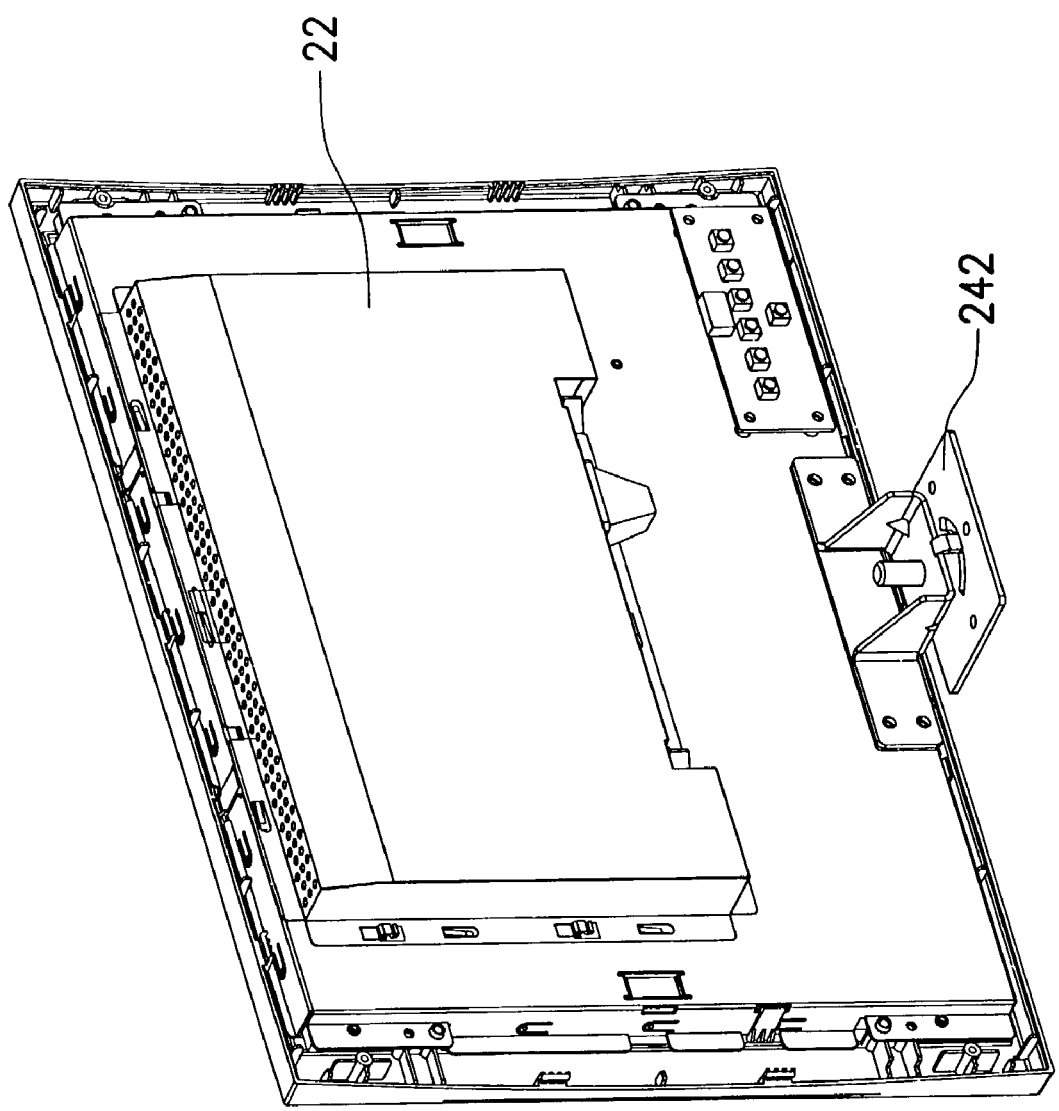

TV WALL FOR LIQUID CRYSTAL DISPLAYS

BACKGROUND OF THE INVENTION

1. Field of the Invention

The invention relates to a TV wall for liquid crystal displays; in particular, to a TV wall with rotating mounting assemblies for easily assembly.

2. Description of the Related Art

Generally, a conventional TV wall is adapted for televisions with CRTs. Referring to FIG. 1, a TV wall 10 is provided with a frame 11 as a body. A plurality of televisions 12 are assembled on the frame 11.

Since the televisions 12 with CRTs are large, the whole TV wall 10 occupies a larger space. In addition, since the televisions 12 with CRTs are heavy, the conventional frame 11 requires additional members to enhance its strength. Even so, there is still some consideration about the strength of the frame 11 due to the weight of the televisions 12. Furthermore, since additional members are mounted on the frame 11, gaps exist between the televisions 12 disposed on the frame 11. As a result, the appearance of the TV wall 10 bearing the televisions 12 is not good.

SUMMARY OF THE INVENTION

In order to address the disadvantages of the aforementioned TV wall, the invention provides a TV wall for liquid crystal displays.

Another purpose of this invention is to provide a TV wall with rotating mounting assemblies for easily assembly.

Accordingly, the invention provides a TV wall. The TV wall comprises a frame, and a plurality of liquid crystal displays. The liquid crystal displays are disposed on the frame.

In a preferred embodiment, the TV wall further comprises a plurality of mounting assemblies for mounting the liquid crystal displays on the frame.

Furthermore, each of the mounting assemblies comprises a first base, a connecting member, a bolt, and a nut. The first base is disposed on the frame, and the connecting member is disposed on the liquid crystal display. The bolt connects the first base and the connecting member. The nut is combined with the bolt.

Furthermore, the first base is welded to the frame, and the connecting member is welded to the liquid crystal display.

In another preferred embodiment, the TV wall further comprises a plurality of rotating mounting assemblies connecting the liquid crystal displays with the frame.

Furthermore, each of the rotating mounting assemblies comprises a second base, and a hinge. The second base is disposed on the frame. The hinge, connecting with the liquid crystal display, is disposed on the second base.

Furthermore, the second base is provided with a plurality of first screw holes, and the hinge is provided with a plurality of first through holes corresponding to the first screw holes respectively. Each of the rotating mounting assemblies further comprises a plurality of first screws corresponding to the first through holes respectively. The first screws are screwed to the first screw holes through the first through holes so that the hinge is disposed on the second base.

Furthermore, the liquid crystal display is provided with a plurality of second screw holes, and the hinge is provided with a plurality of second through holes corresponding to the second screw holes respectively. Each of the rotating mounting assemblies further comprises a plurality of second screws corresponding to the second through holes respectively. The second screws are screwed to the second screw holes through the second through holes so that the hinge is connected with the liquid crystal display.

Furthermore, the second base is welded to the frame, and the hinge is welded to the liquid crystal display.

In another preferred embodiment, each of the rotating mounting assemblies comprises a third base, and a rotating member. The third base is disposed on the frame. The rotating member, connecting with the liquid crystal display, is disposed on the third base in a rotatable manner.

Furthermore, the frame is provided with a plurality of pairs of first rods and second rods facing each other, and each of the first rods is provided with at least one third through hole. The third base is provided with at least one pin and a bending portion corresponding to the second rod. The pin is inserted into the third through hole and the bending portion abuts the second rod so that the third base is disposed on the frame.

Furthermore, the second rod is rhomboid in cross-section, and the bending portion is "<"-shaped in cross-section.

In another preferred embodiment, each of the rotating mounting assemblies comprises a third base, a rotating member, and a stopper. The third base is disposed on the frame. The rotating member, connecting with the liquid crystal display, is disposed on the third base in a rotatable manner. The stopper is disposed on the third base in a rotatable manner.

Furthermore, the frame includes a plurality of pairs of first rods and second rods facing each other. Each of the first rods includes a third through hole. The third base includes a pin corresponding to the third through hole, a first bending portion corresponding to the first rod, and a second bending portion corresponding to the second rod. The pin is inserted into the third through hole and the second rod holds the second bending portion and the stopper abuts the second rod so that the third base is disposed on the frame.

Furthermore, both the first rod and the second rod are rhomboid in cross-section, and the first bending portion is "<"-shaped in cross-section.

Furthermore, each of the rotating mounting assemblies further comprises a cushion member disposed around the stopper. The cushion member is located between the stopper and the second rod when the stopper abuts the second rod.

In another preferred embodiment, this invention provides a rotating mounting assembly for a TV wall. The TV wall is provided with a frame and a plurality of liquid crystal displays, and the frame is provided with a plurality of pairs of first rods and second rods facing each other. Each of the first rods is provided with at least one through hole. The rotating assembly comprises a base and a rotating member. The base, having at least one pin and a bending portion corresponding to the second rod, is disposed on the frame in a manner such that the pin is inserted into the through hole and the bending portion abuts the second rod. The rotating member, connecting with the liquid crystal display, is disposed on the base in a rotatable manner.

In another preferred embodiment, this invention provides a rotating mounting assembly for a TV wall. The TV wall is provided with a frame and a plurality of liquid crystal displays, and the frame is provided with a plurality of pairs of first rods and second rods facing each other. Each of the first rods is provided with at least one through hole. The rotating assembly comprises a base, a stopper and a rotating member. The base includes a pin corresponding to the through hole, a first bending portion corresponding to the first rod, and a second bending portion corresponding to the second rod. The stopper is disposed on the base in a rotatable manner. The base is disposed on the frame in a manner such that the pin is inserted into the through hole and the second rod holds the second bending portion and the second bending portion abuts the second rod. The rotating member, connecting with the liquid crystal display, disposed on the base in a rotatable manner.

BRIEF DESCRIPTION OF THE DRAWINGS

The invention is hereinafter described in detail with reference to the accompanying drawings in which:

FIG. 3b is a partial schematic view that shows a frame, a liquid crystal display, and a fixed assembly in FIG. 3a;

FIG. 3c is a perspective view of a connecting member and a liquid crystal display in FIG. 3a;

FIG. 4b is a perspective view of a hinge in FIG. 4a;

FIG. 4c is a perspective view of a hinge and a liquid crystal display in FIG. 4a;

FIG. 7b is a partial enlarged view that shows a rotating mounting assembly and a frame in FIG. 7a;

FIG. 10b is a partial enlarged view that shows a rotating mounting assembly and a frame in FIG. 9a.

DETAILED DESCRIPTION OF THE INVENTION

First Embodiment

Figure 1:
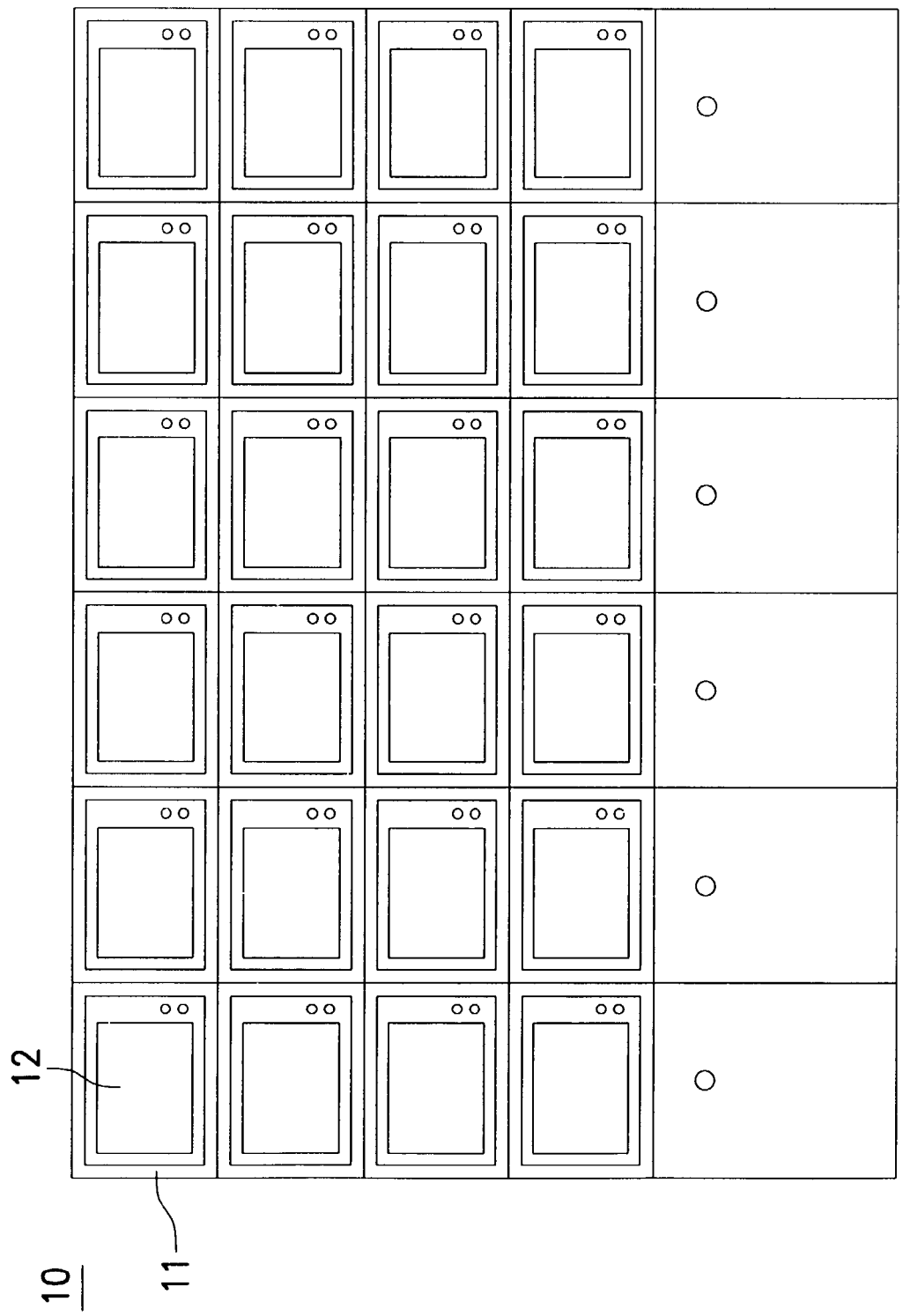
FIG. 1 is a schematic view of a conventional TV wall for televisions with CRTs.
Figure 2A:
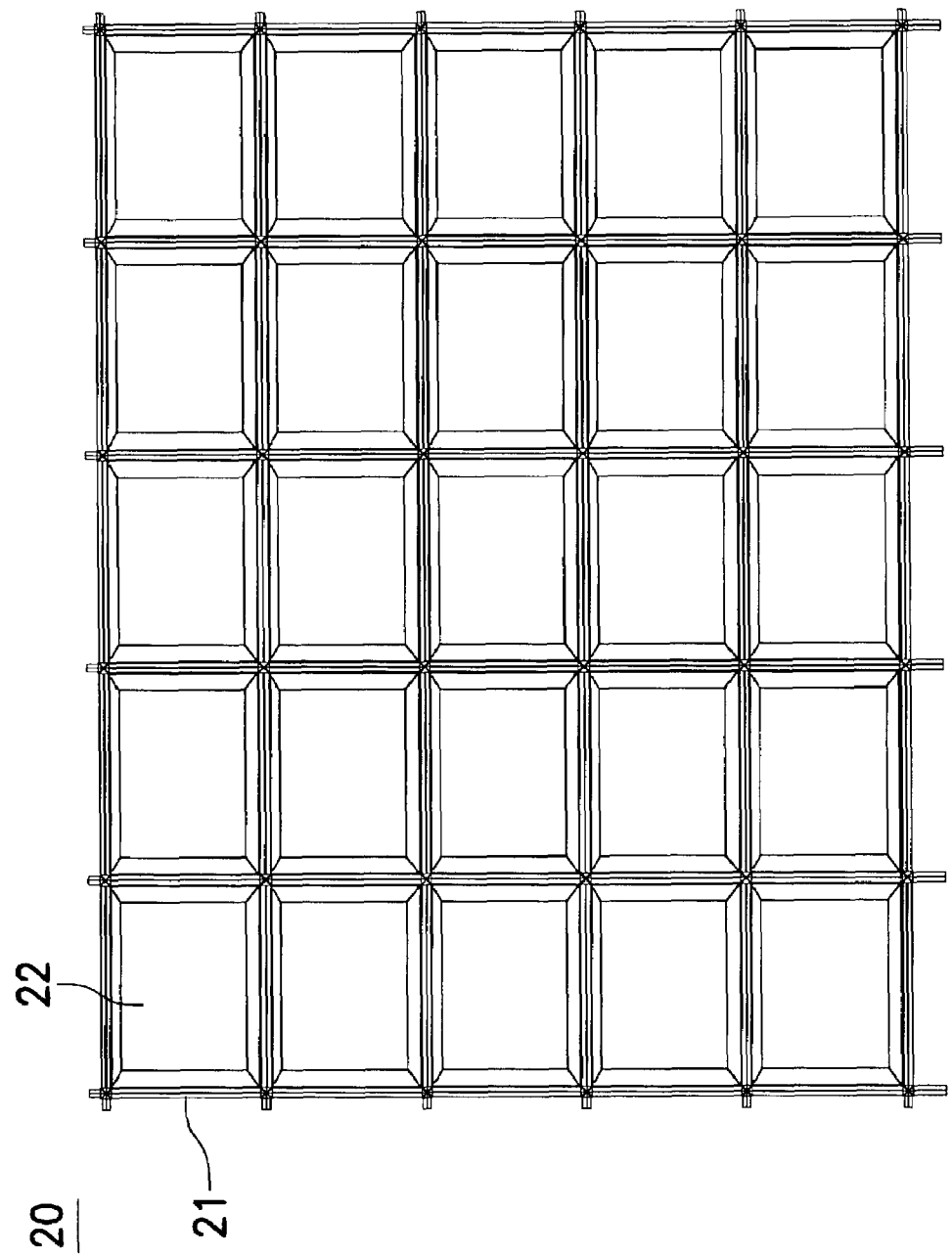
FIG. 2a and FIG. 2b are schematic views of a TV wall for liquid crystal displays as disclosed in this invention.
Figure 2B:
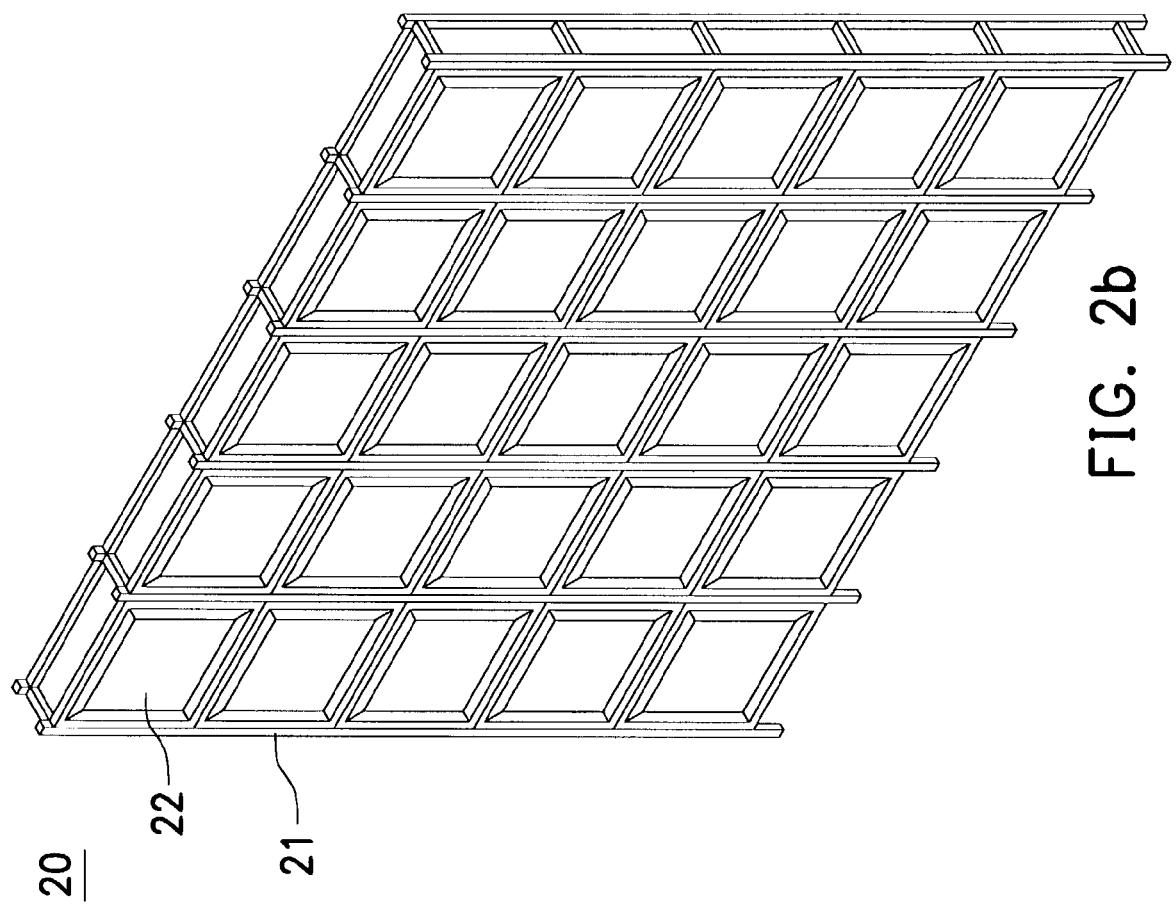

Referring to FIG. 2a, FIG. 2b, FIG. 3a, FIG. 3b and FIG. 3c, a TV wall 20 of a first embodiment as disclosed in this invention comprises a frame 21, a plurality of liquid crystal displays 22, and a plurality of mounting assemblies 23.

The frame 21 is used as a body of the TV wall 20. Unlike the conventional TV wall 10, there is no requirement for additional members to enhance the strength of the frame 21 since the liquid crystal displays 22 are lighter in weight. The liquid crystal displays 22 are disposed on the frame 21, and used as screens for the TV wall 20.

Figure 3A:
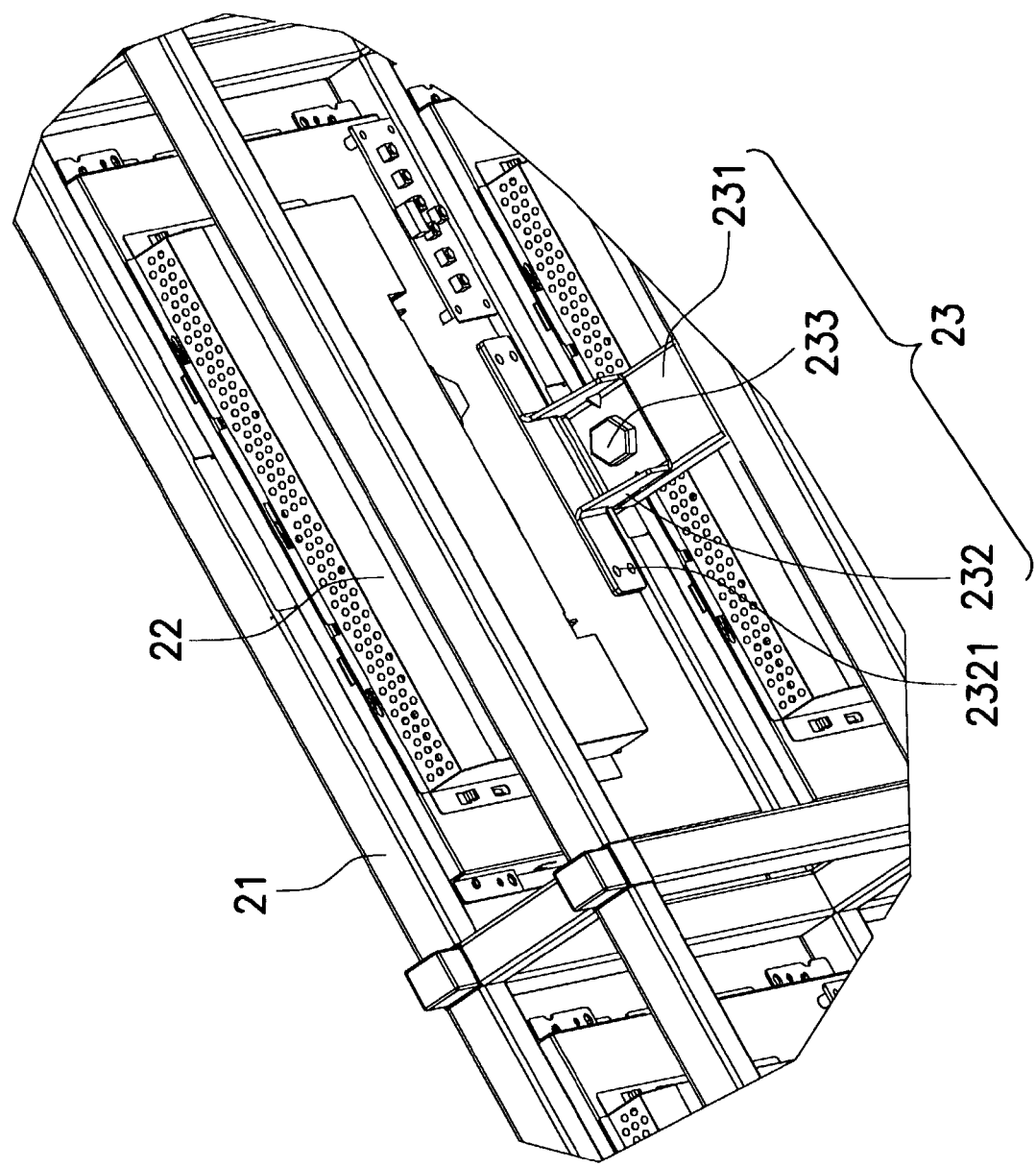
FIG. 3a is a partial schematic view of a TV wall of a first embodiment as disclosed in this invention.
Figure 3B:
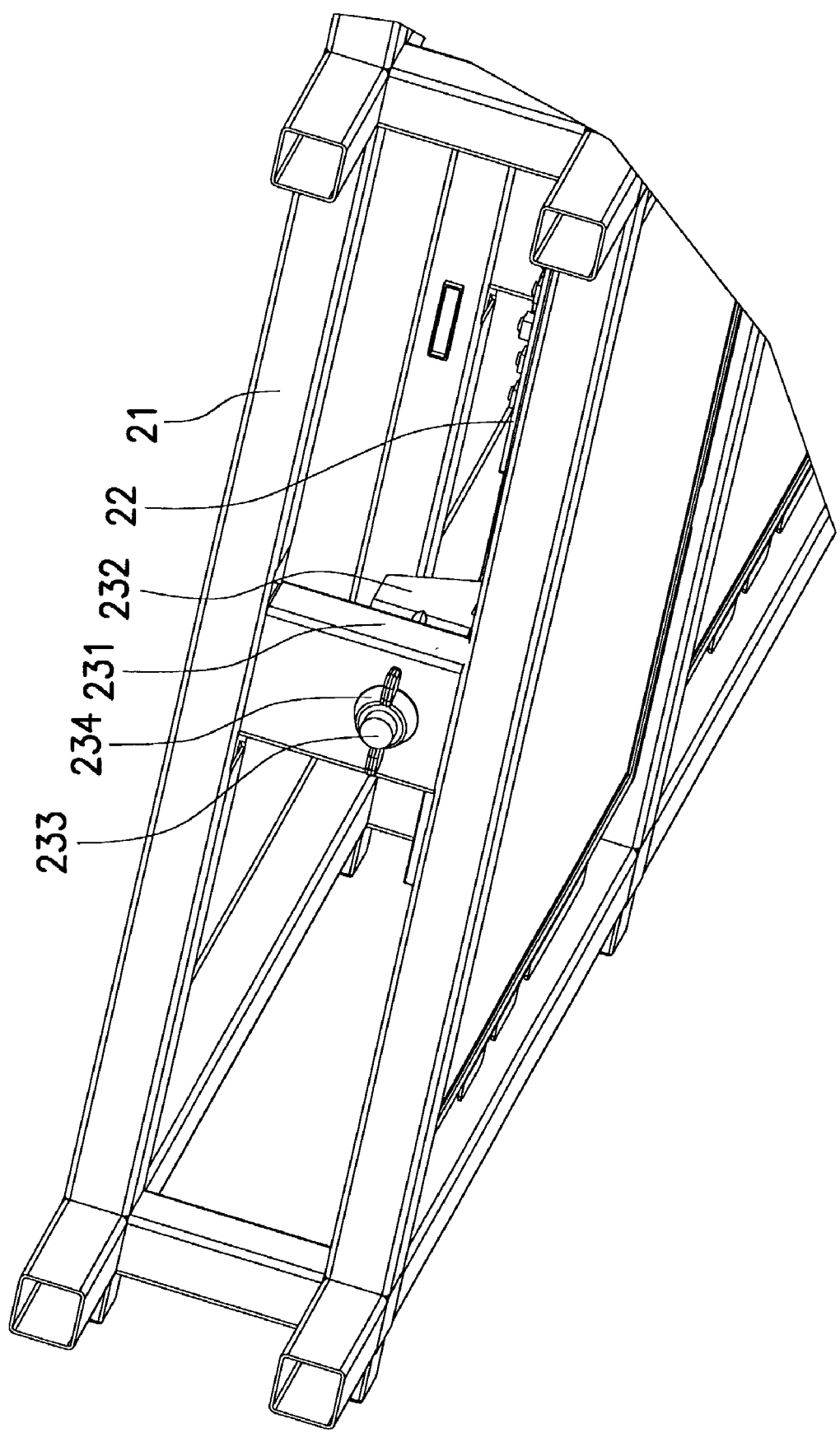
Figure 3C:
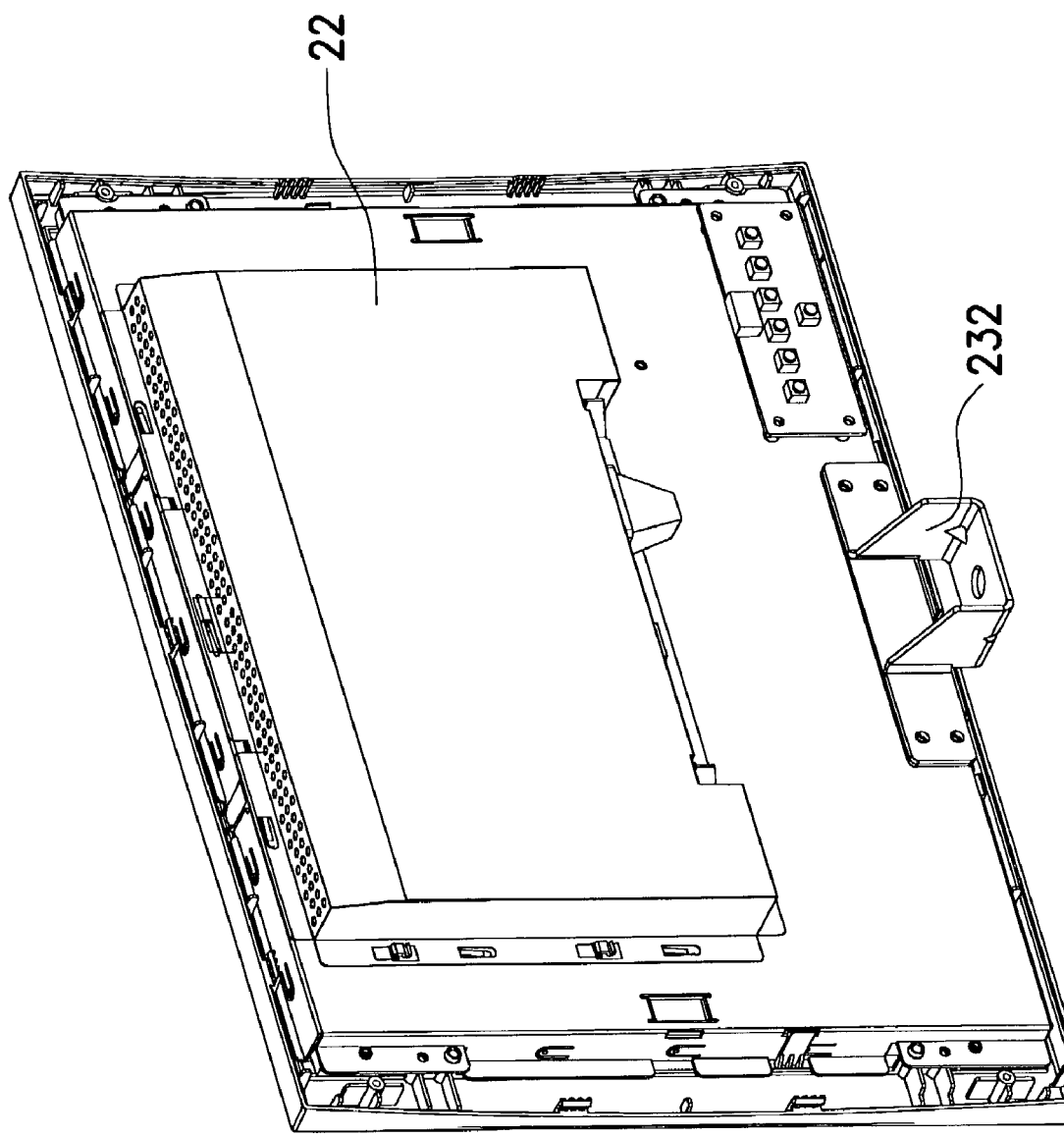

The mounting assemblies 23 connect the liquid crystal displays 22 to the frame 21. As shown in FIG. 3b, each of the mounting assemblies 23 comprises a first base 231, a connecting member 232, a bolt 233, and a nut 234. The first base 231 is welded to the frame 21, and is used as a support for the mounting assembly 23. The connecting member 232 is welded to the liquid crystal display 22. The bolt 233 connects the first base 231 and the connecting member 232, and the nut 234 is combined with the bolt 233.

After the liquid crystal display 22 is disposed on the frame 21, the liquid crystal display 22 can be rotated by releasing the nut 234. Thus, the display quality of the liquid crystal display 22 can be adjusted if the adjusting button for display quality is located at the back surface of the liquid crystal display 22.

It is noted that the manner such that the first base 231 mounted on the frame 21 and the manner such that the connecting member 232 mounting on the liquid crystal display 22 are not limited to welding. For example, the connecting member 232 can be disposed on the liquid crystal display 22 by unillustrated screws threaded to unillustrated screw holes of the liquid crystal display 22 through fourth through holes 2321 of the connecting member 232.

Since the liquid crystal display is thin, the TV wall with the liquid crystal displays occupies smaller space than the conventional TV wall. In addition, since the liquid crystal display is lightweight, the TV wall with the liquid crystal displays can be easily applied in varied environments.

Second Embodiment

Figure 4A:
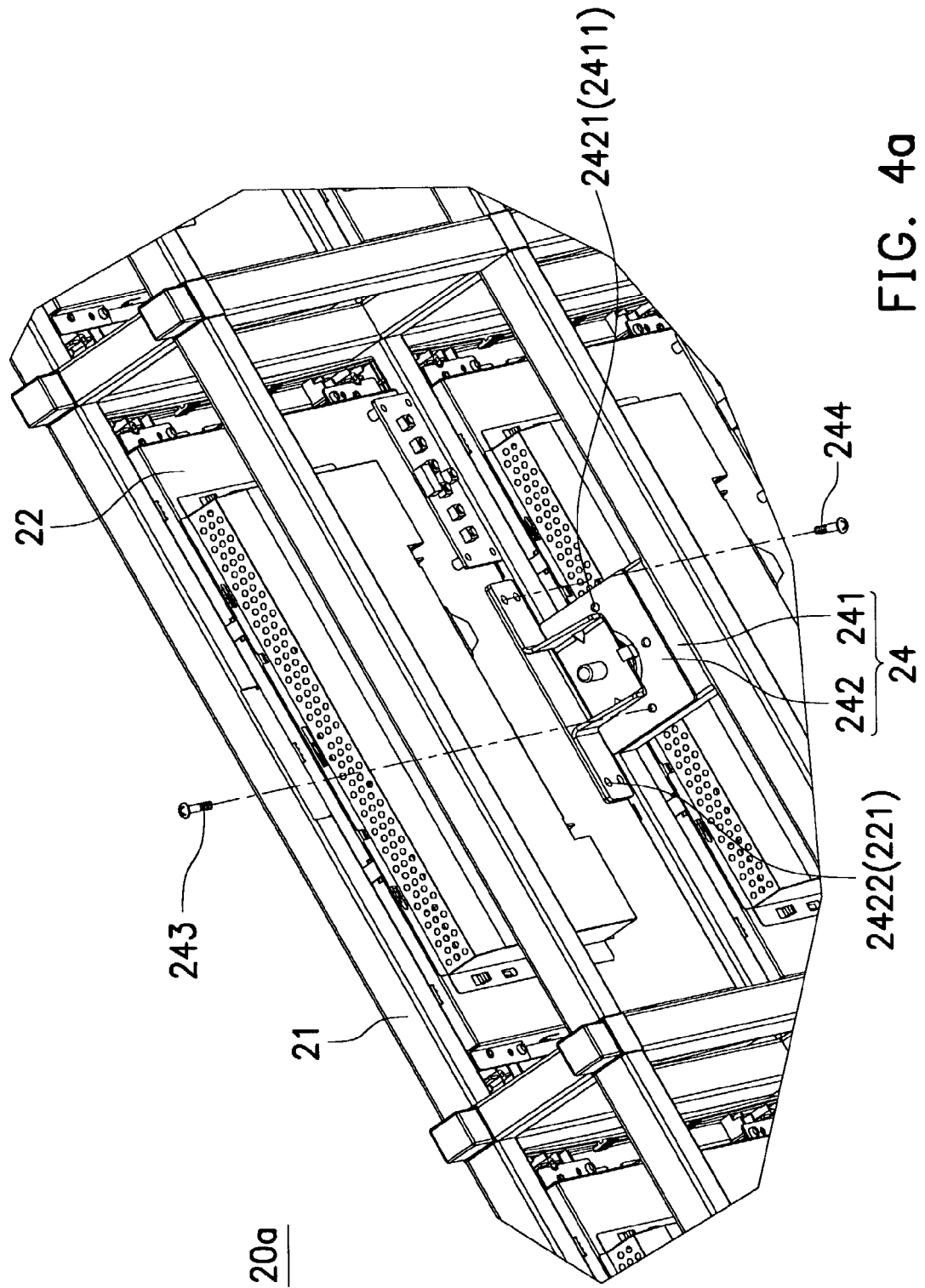
FIG. 4a is a partial schematic view of a TV wall of a second embodiment as disclosed in this invention.
Figure 4B:
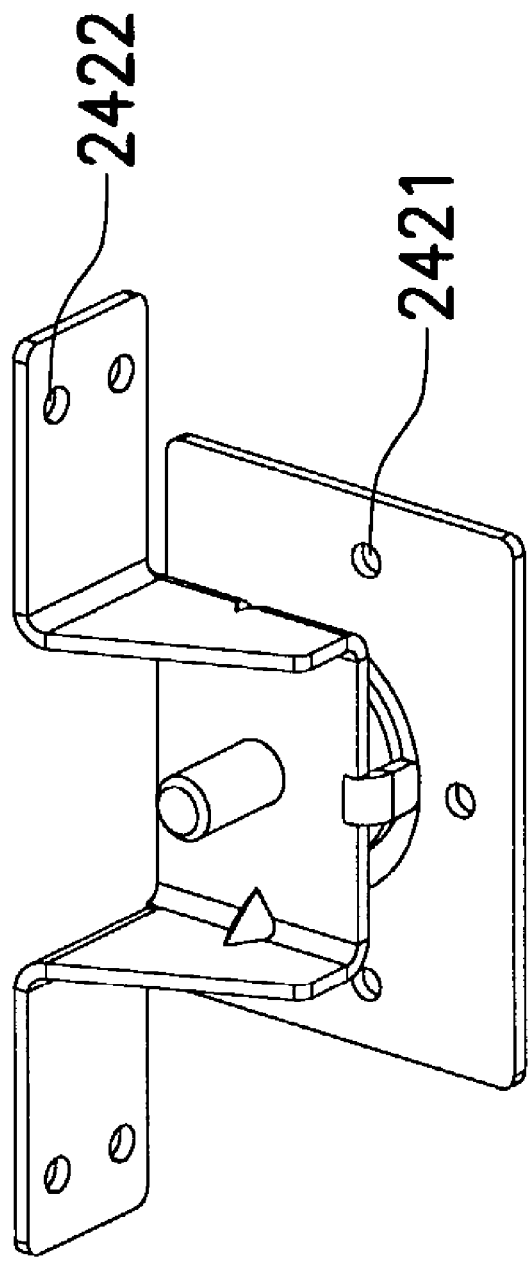

Referring to FIG. 4a, FIG. 4b and FIG. 4c, a TV wall 20a of a second embodiment as disclosed in this invention comprises a frame 21, a plurality of liquid crystal displays 22, and a plurality of first rotating mounting assemblies 24.

The frame 21 and the liquid crystal display 22 in this embodiment are similar to those of the first embodiment; therefore, their description is omitted. The first rotating mounting assemblies 24 connect the liquid crystal displays 22 to the frame 21. As shown in FIG. 4a, each of the first rotating mounting assemblies 24 comprises a second base 241, a hinge 242, a plurality of first screws 243, and a plurality of second screws 244.

The second base 241 is welded to the frame 21, and is provided with a plurality of first screw holes 2411 corresponding to the first screws 243 respectively. The hinge 242, connecting with the liquid crystal display 22, is provided with a plurality of first through holes 2421 corresponding to the first screw holes 2411 respectively. The first screws 243 are screwed to the first screw holes 2411 through the first through holes 2421 so that the hinge 242 is disposed on the second base 241. The liquid crystal display 22 is provided with a plurality of second screw holes 221 corresponding to the second screws 244 respectively. The hinge 242 is provided with a plurality of second through holes 2422 corresponding to the second screw holes 221 respectively. The second screws 244 are screwed to the second screw holes 221 through the second through holes 2422 so that the hinge 242 is connected with the liquid crystal display 22.

The liquid crystal display 22 can be rotated relative to the frame 21 by means of the hinge 242. Thus, the display quality of the liquid crystal display 22 can be adjusted if the adjusting button for display quality is located at the back surface of the liquid crystal display 22.

It is noted that the manner in which the second base 241 is mounted on the frame 21 is not limited to welding. Also, the manner in which the hinge 242 is mounted on the liquid crystal display 22 is not limited to screws.

Like the first embodiment, the TV wall in this embodiment is also applied for liquid crystal displays. Thus, the TV wall in this embodiment can attain the same advantages as the first embodiment.

Third Embodiment

Referring to FIG. 5, FIG. 6a, FIG. 6b, FIG. 7a, FIG. 7b and FIG. 8, a TV wall of a third embodiment as disclosed in this invention comprises a frame 21a, a plurality of liquid crystal displays 22, and a plurality of second rotating mounting assemblies 27.

Figure 5:
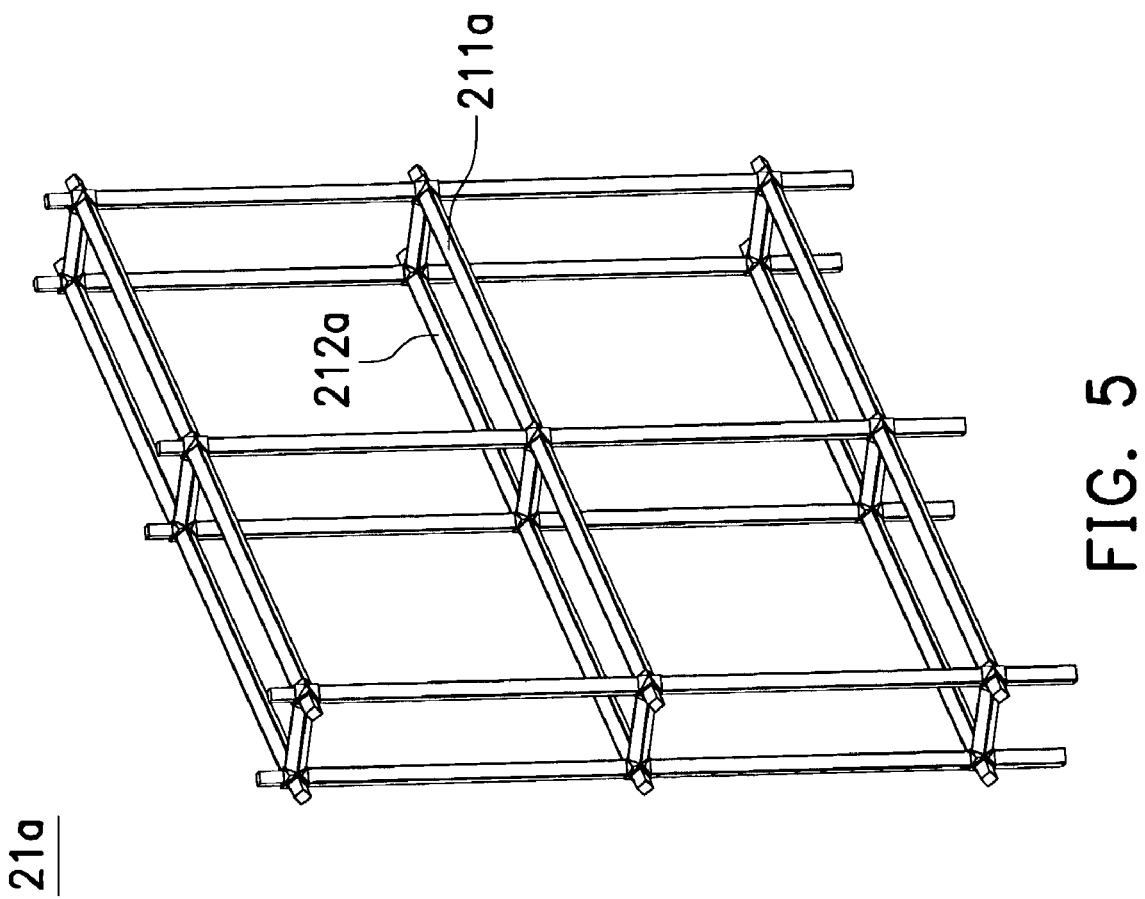
FIG. 5 is a partial schematic view of a frame of a TV wall of a third embodiment as disclosed in this invention.

The liquid crystal displays 22 in this embodiment are similar to those of the first embodiment; therefore, their description is omitted. It is noted that the frame 21a in this embodiment is shown in FIG. 5. The frame 21a is provided with a plurality of pairs of first rods 211a and second rods 212a facing each other. Each of the first rods 211a is provided with a third through hole 2111a as shown in FIG. 7b. The first rod 211a and the second rod 212a are rhomboid in cross-section as shown in FIG. 7a.

Figure 6A:
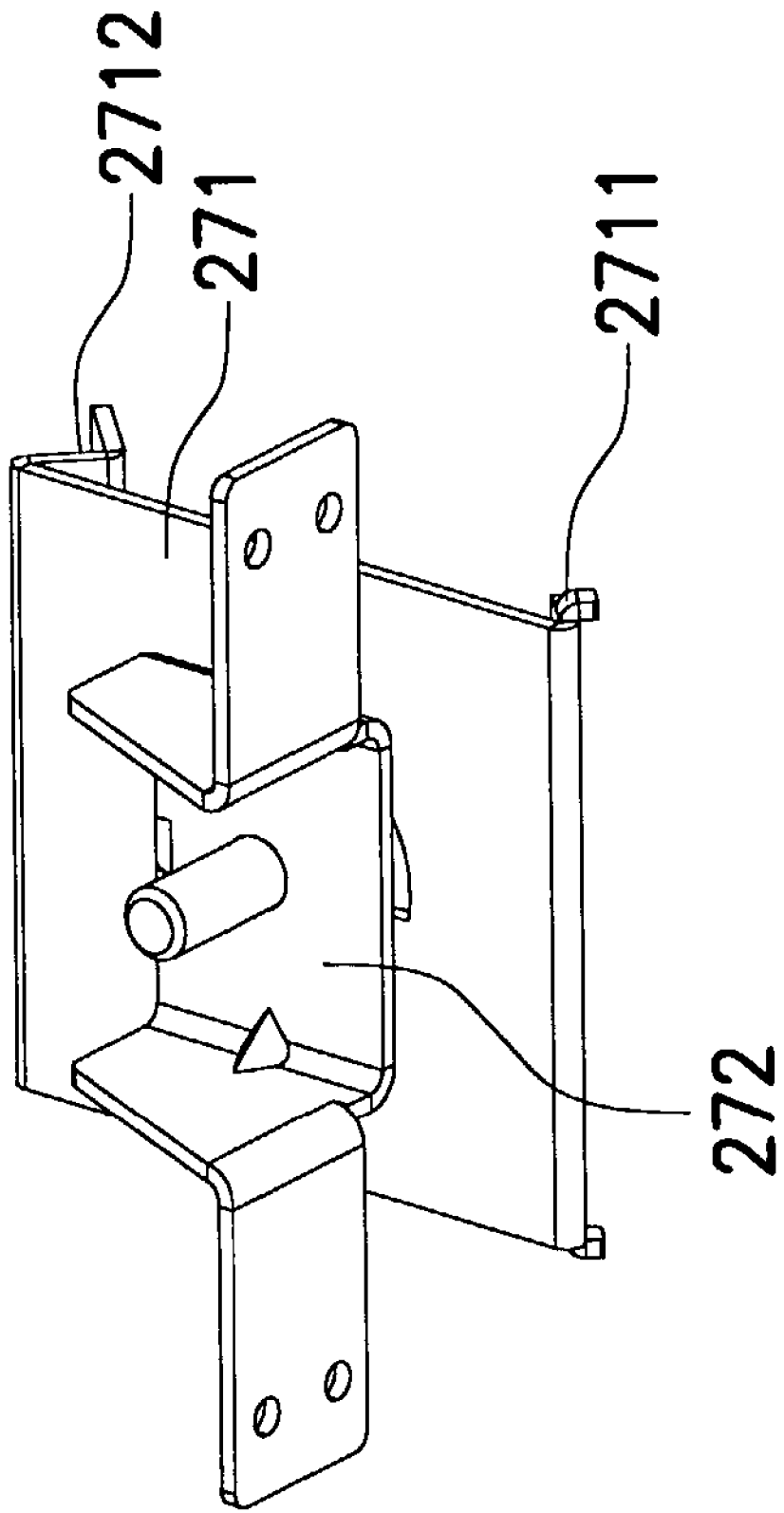
FIG. 6a and FIG. 6b are schematic views of a rotating mounting assembly of a TV wall of a third embodiment as disclosed in this invention.

The second rotating mounting assemblies 27 connect the liquid crystal displays 22 with the frame 21a. As shown in FIG. 6a, each of the second rotating mounting assemblies 27 comprises a third base 271, and a rotating member 272.

Figure 6B:
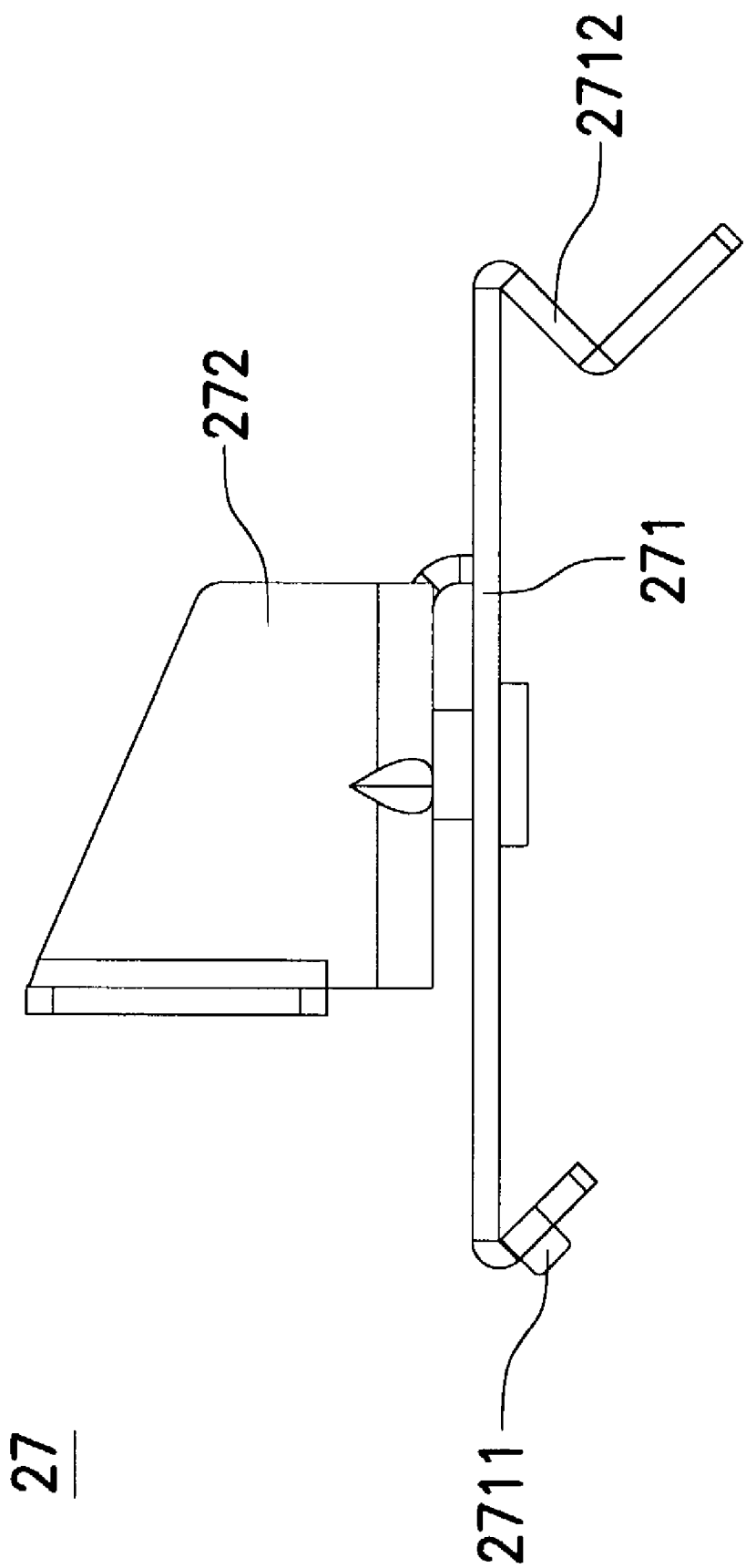
Figure 7A:
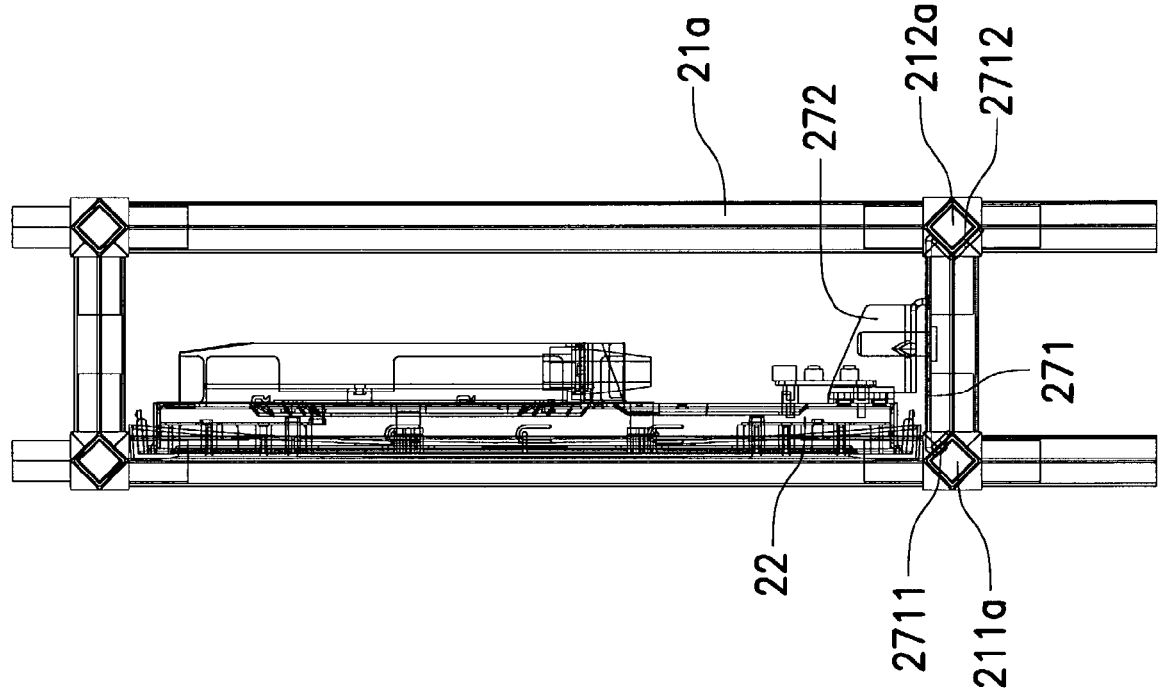
FIG. 7a is a partial schematic view of a TV wall of a third embodiment as disclosed in this invention.
Figure 7B:
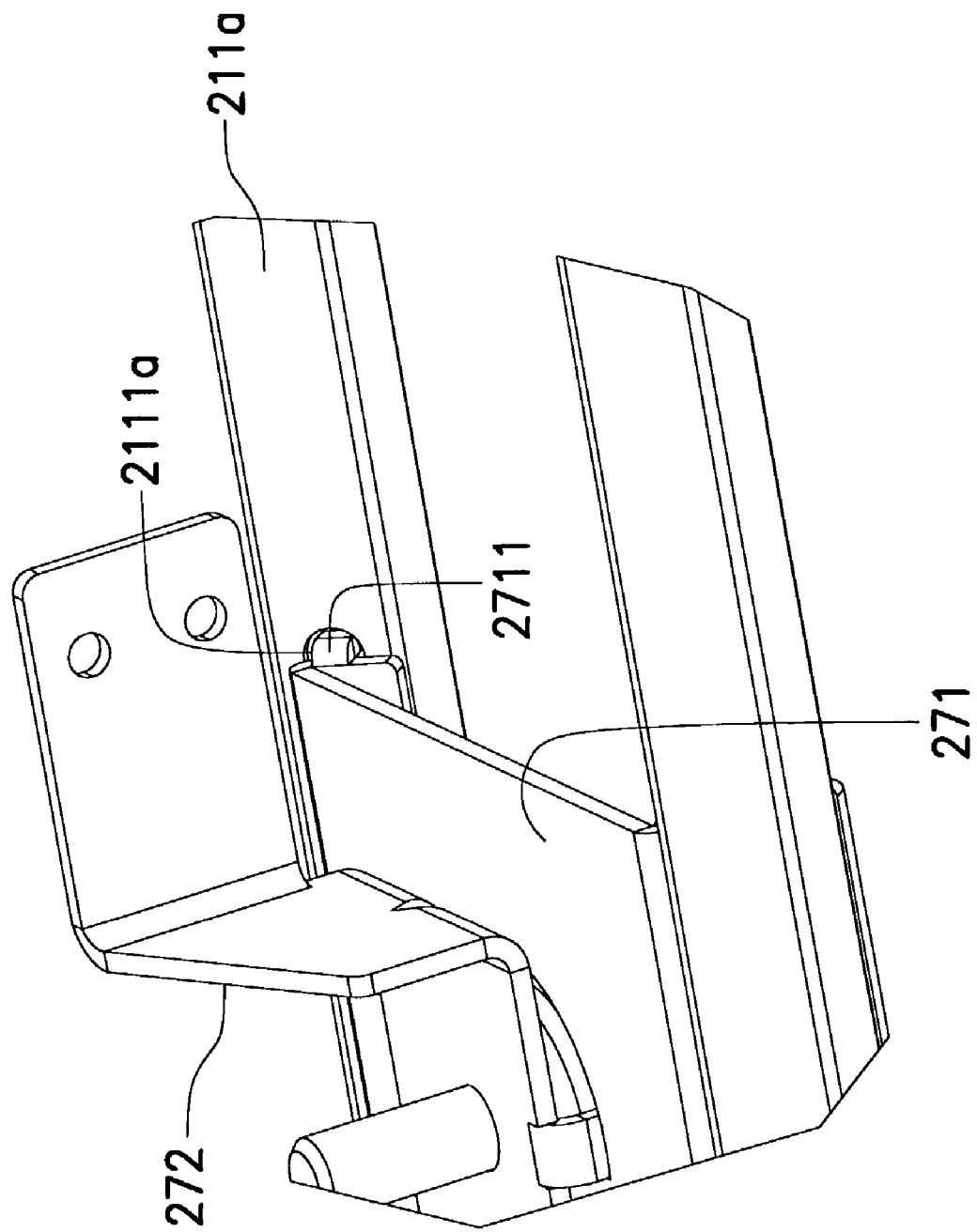

As shown in FIG. 6a, FIG. 6b and FIG. 7a, the third base 271 is provided with two pins 2711 at one side facing the first rod 211a, and is formed with a bending portion 2712 at the other side facing the second rod 212a. The shape of the bending portion 2712 corresponds to that of the second rod 212a; that is, the bending portion 2712 is "<"-shaped in cross-section. When the third base 271 is disposed on the frame 21a, the pins 2711 are inserted into the third through holes 2111a of the first rod 211a and the bending portion 2712 abuts the second rod 212a.

The rotating member 272, connecting with the liquid crystal display 22 by welding or screws, is disposed on the third base 271 in a rotatable manner.

Figure 8:
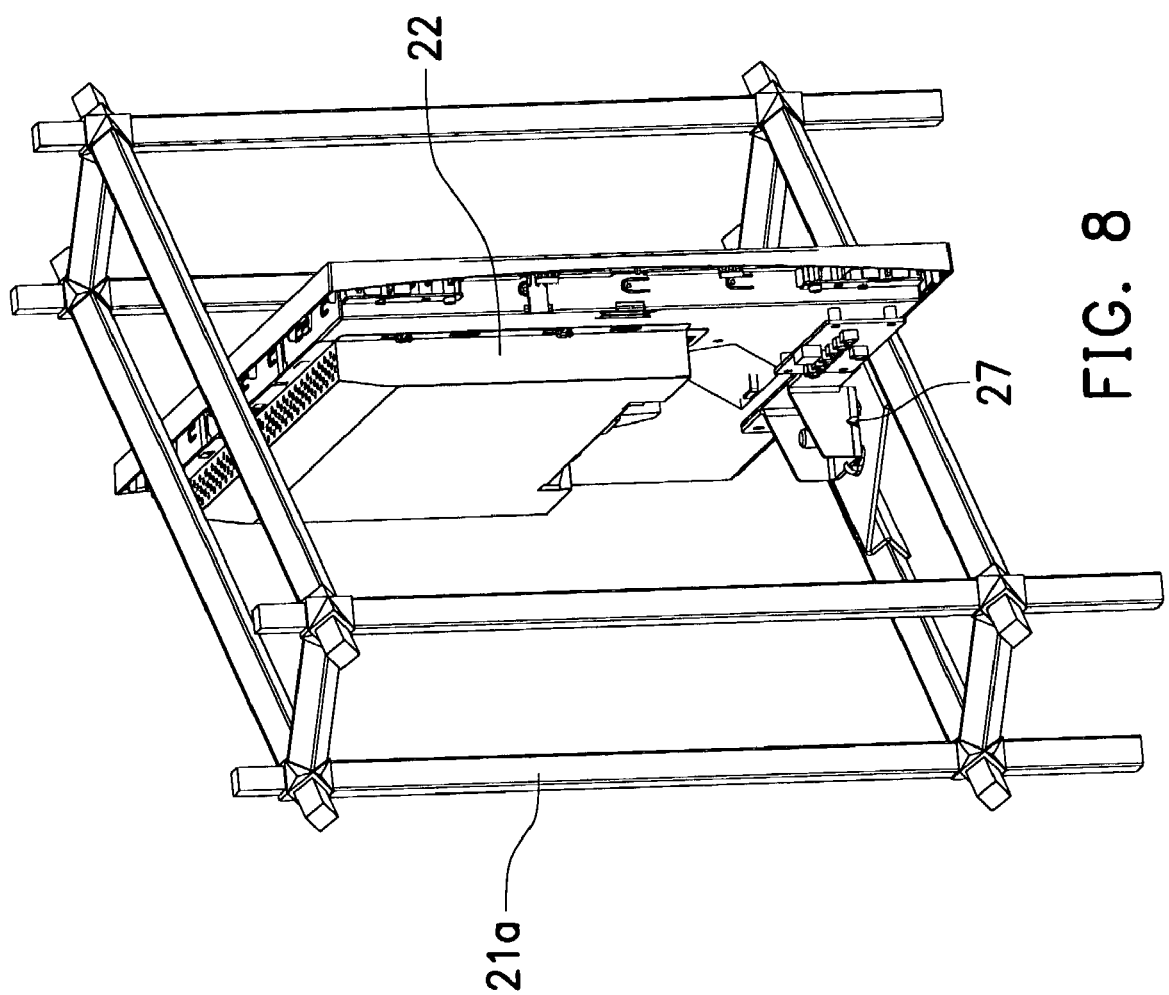
FIG. 8 is a partial schematic view of a TV wall as disclosed in this invention, wherein the liquid crystal display is rotated at a predetermined angle.

The liquid crystal display 22 can be rotated relative to the frame 21a by means of the second rotating mounting assemblies 27 as shown in FIG. 8. Thus, the display quality of the liquid crystal display 22 can be adjusted if the adjusting button for display quality is located at the back surface of the liquid crystal display 22. In addition, by means of the engaging manner between the second rotating mounting assemblies 27 and the frame 21a, the liquid crystal display 22 can be easily assembled and detached.

It is understood that the second rotating mounting assembly 27 in this embodiment is an improved structure of the conventional hinge. The third base 271 of the second rotating mounting assembly 27 fits the second rod 212a of the frame 21a, rhomboid in cross-section. Thus, the liquid crystal display 22 can be easily mounted on the frame 21a. Also, by means of the second rotating mounting assemblies 27, the liquid crystal display 22 can be precisely positioned during rotation.

Specifically, when the second rotating mounting assembly 27 is mounted on the frame 21a, the pin 2711 is inserted into the third through holes 2111a of the first rod 211a at an inclined angle. Thus, the pin 2711 is not only combined with the first rod 211a, but also precisely positioned on the first rod 211a. Furthermore, since the shape of the bending portion 2712 fits that of the second rod 212a, the bending portion 2712 easily fits the second rod 212a when the third base 271 is mounted on the frame 21a. Also, since the bending portion 2712 is engaged with the second rod 212a, the third base 271 is precisely positioned on the frame 21a in all directions.

It is noted that the shape of the cross section of the rod is not limited to rhomboid as long as the bending portion of the base fits the rod of the frame.

Fourth Embodiment

Referring to FIG. 9a, FIG. 9b, FIG. 10a, and FIG. 10b, a TV wall of a fourth embodiment as disclosed in this invention comprises a frame 21a, a plurality of liquid crystal displays 22, and a plurality of third rotating mounting assemblies 28.

The frame 21a and the liquid crystal displays 22 in this embodiment are similar to those of the third embodiment; therefore, their description is omitted.

Figure 9A:
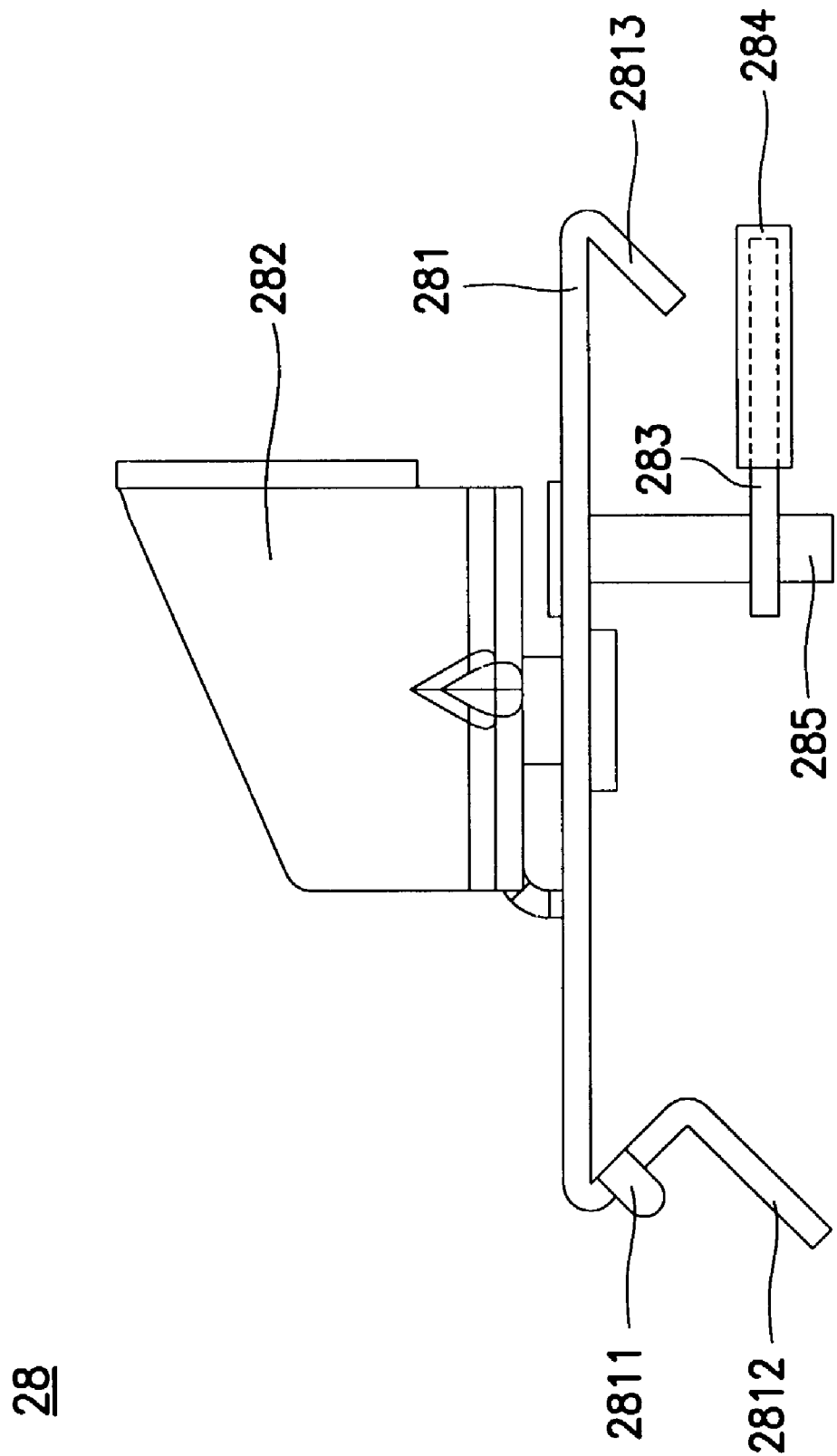
FIG. 9a and FIG. 9b are schematic views of a rotating mounting assembly of a TV wall of a fourth embodiment as disclosed in this invention.
Figure 9B:
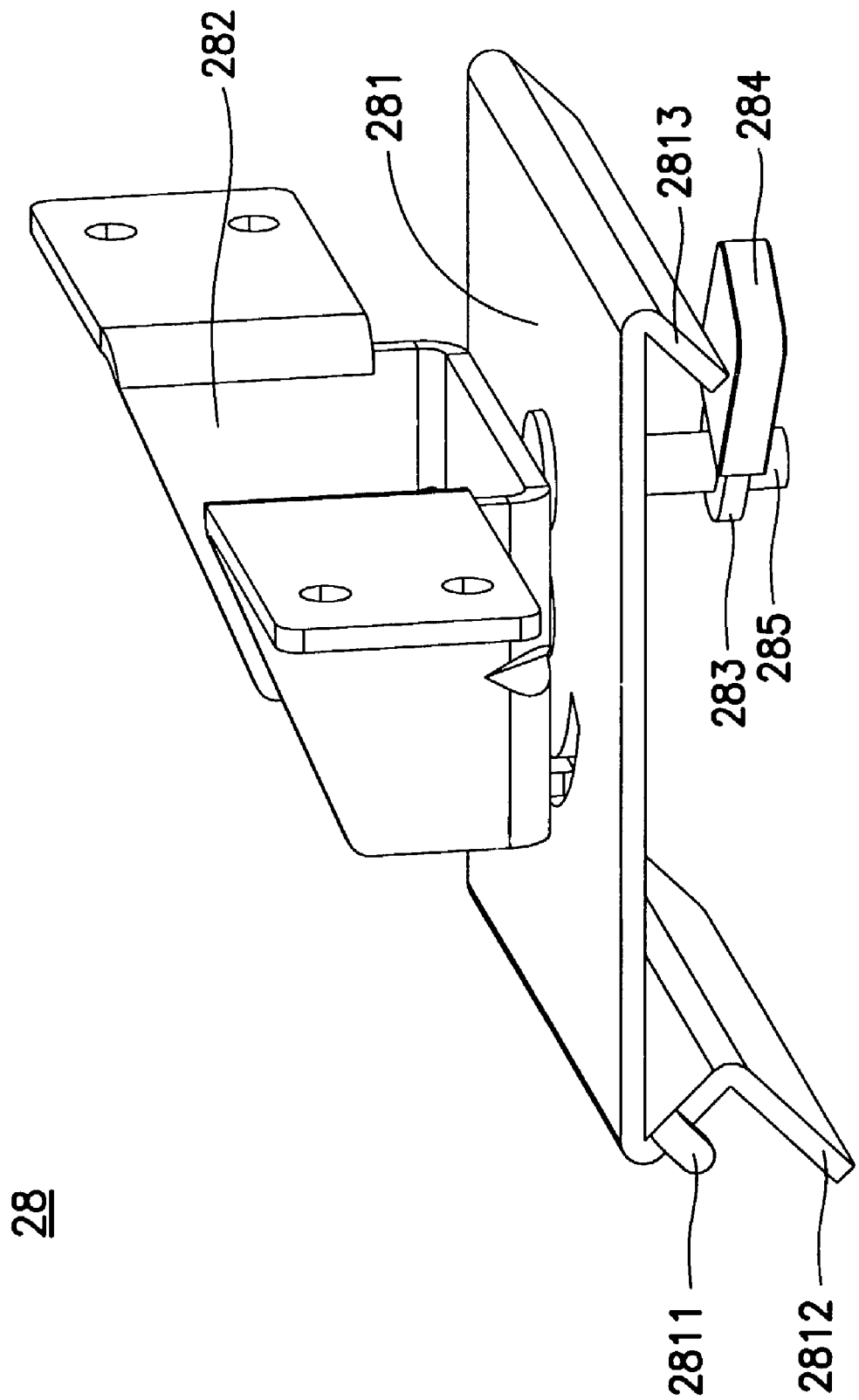
Figure 10A:
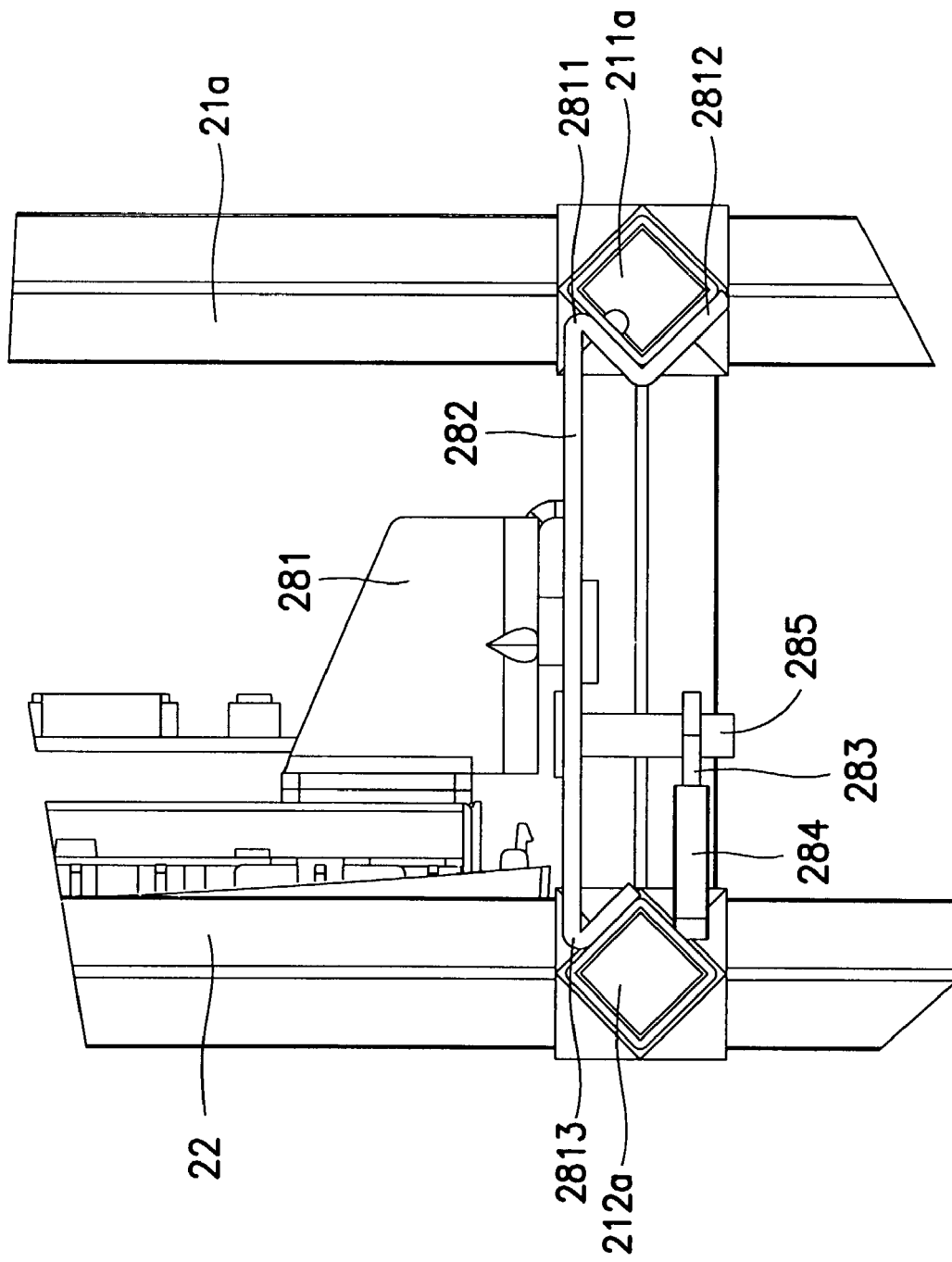
FIG. 10a is a partial schematic view of a TV wall of a fourth embodiment as disclosed in this invention.
Figure 10B:
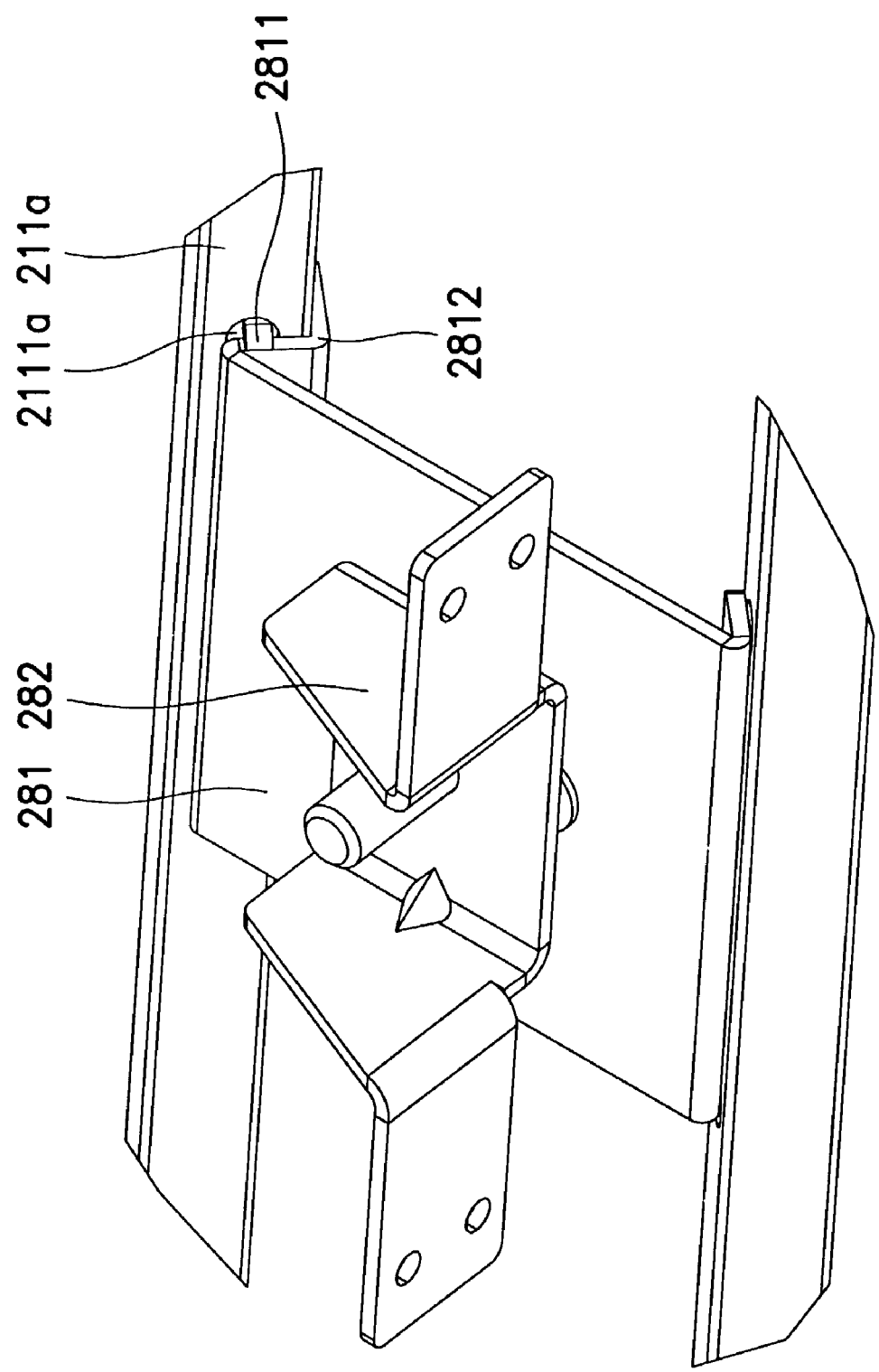

The third rotating mounting assemblies 28 connect the liquid crystal displays 22 with the frame 21a. As shown in FIG. 9a, each of the third rotating mounting assemblies 28 comprises a base 281, a rotating member 282, a stopper 283, a cushion member 284, and a shaft 285.

As shown in FIG. 9a, FIG. 9b, FIG. 10a, and FIG. 10b, the base 281 is provided with two pins 2811 and a first bending portion 2812 at one side facing the first rod 211a, and is formed with a second bending portion 2813 at the other side facing the second rod 212a. The shape of the first bending portion 2812 corresponds to that of the first rod 211a; that is, the first bending portion 2812 is "<"-shaped in cross-section. When the base 281 is disposed on the frame 21a, the pins 2811 are inserted into the third through holes 2111a of the first rod 211a, and the second rod 212a holds the second bending portion 2813.

The rotating member 282, connecting with the liquid crystal display 22 by welding or screws, is disposed on the base 281 in a rotatable manner. The stopper 283 is disposed on the base 281 in a rotatable manner by the shaft 285. The cushion member 284 is disposed around the stopper 283. The cushion member 284 is located between the stopper 283 and the second rod 212a when the stopper 283 abuts the second rod 212a. Thus, the cushion member 284 can prevent the movement between the stopper 283 and the second rod 212a.

The liquid crystal display 22 can be rotated relative to the frame 21a by means of the third rotating mounting assemblies 28. Thus, the display quality of the liquid crystal display 22 can be adjusted if the adjusting button for display quality is located on the back surface of the liquid crystal display 22. In addition, by means of the engaging manner between the third rotating mounting assemblies 28 and the frame 21a, the liquid crystal display 22 can be easily assembled and detached.

It is understood that the third rotating mounting assembly 28 in this embodiment is an improved structure of the conventional hinge. The base 281 of the third rotating mounting assembly 28 fits the first rod 211a of the frame 21a, rhomboid in cross-section. Thus, the liquid crystal display 22 can be easily mounted on the frame 21a. Also, by means of the third rotating mounting assemblies 28, the liquid crystal display 22 can be precisely positioned during rotation.

Specifically, when the third rotating mounting assembly 28 is mounted on the frame 21a, the pin 2811 is firstly inserted into the third through holes 2111a of the first rod 211a at an inclined angle. Thus, the pin 2811 is not only combined with the first rod 211a, but also precisely positioned on the first rod 211a. Then, the second bending portion 2813 is placed on the second rod 212a. Finally, the stopper 283 is rotated to abut the second rod 212a. It is noted that since the shape of the first bending portion 2812 fits that of the first rod 211a, the first bending portion 2812 easily fits the first rod 211a when the base 281 is mounted on the frame 21a. Also, the base 281, disposed on the frame 21a, is not easily moved due to the vibration.

Furthermore, when the third rotating mounting assembly 28, disposed on the frame 21*a*, is removed from the frame 21*a*, the stopper 283 is firstly rotated to not abut the second rod 212*a*. Then, the third rotating mounting assembly 28 is moved toward the second rod 212*a* so that the third rotating mounting assembly 28 is removed from the frame 21*a*.

It is noted that the cross section of the rod is not limited to a rhomboid shape as long as the bending portion of the base fits the rod of the frame.

In addition, compared with the third embodiment, since the base 281 of this embodiment abuts the second rod 212*a* at one side by the second bending portion 2813, the third rotating mounting assembly 28 can be easily assembled to the frame 21*a*. Also, since the cushion member 284 is disposed around the stopper 283, the stopper 283 can abut the second rod 212*a* without a gap. As a result, the third rotating mounting assembly 28 can be fixedly disposed on the frame 21*a*, and the stability of the TV wall is also enhanced.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A TV wall comprising:
    a frame;
    a plurality of liquid crystal displays disposed on the frame; and
    a plurality of rotating mounting assemblies connecting the liquid crystal displays with the frame, wherein each of the rotating mounting assemblies comprises:
    a base, disposed on the frame, including a plurality of first screw holes;
    a hinge, connecting with the liquid crystal display, disposed on the base, wherein the hinge includes a plurality of first through holes corresponding to the first screw holes; and
    a plurality of first screws corresponding to the first through holes respectively, whereby the first screws are screwed to the first screw holes through the first through holes so that the hinge is disposed on the base.

2. The TV wall as claimed in claim 1, wherein the liquid crystal display comprises a plurality of second screw holes, and the hinge comprises a plurality of second through holes corresponding to the second screw holes respectively, and each of the rotating mounting assemblies further comprises a plurality of second screws corresponding to the second through holes respectively, whereby the second screws are screwed to the second screw holes through the second through holes so that the hinge is connected with the liquid crystal display.

3. The TV wall as claimed in claim 1, wherein the base is welded to the frame.

4. The TV wall as claimed in claim 1, wherein the hinge is welded to the liquid crystal display.

5. A rotating mounting assembly for a TV wall, wherein the TV wall includes a frame and a plurality of liquid crystal displays, and the frame includes a plurality of pairs of first rods and second rods facing each other, and each of the first rods includes a through hole, and the rotating mounting assembly comprises:
    a base including a pin corresponding to the first rod, and a bending portion corresponding to the second rod, wherein the base is disposed on the frame in a manner such that the pin is inserted into the through hole and the bending portion abuts the second rod; and
    a rotating member, connecting with the liquid crystal display, disposed on the base in a rotatable manner.

6. The rotating mounting assembly as claimed in claim 5, wherein the second rod is rhomboid in cross-section, and the bending portion is "<"-shaped in cross-section.

7. The rotating mounting assembly as claimed in claim 5, wherein the rotating member is welded to the liquid crystal display, or is mounted on the liquid crystal display by screws.

8. A rotating mounting assembly for a TV wall, wherein the TV wall includes a frame and a plurality of liquid crystal displays, and the frame includes a plurality of pairs of first rods and second rods facing each other, and each of the first rods includes a through hole, and the rotating mounting assembly comprises:
    a base including a pin corresponding to the through hole, a first bending portion corresponding to the first rod, and a second bending portion corresponding to the second rod; and
    a stopper disposed on the base in a rotatable manner, wherein the base is disposed on the frame in a manner such that the pin is inserted into the through hole and the second rod holds the second bending portion and the second bending portion abuts the second rod; and
    a rotating member, connecting with the liquid crystal display, disposed on the base in a rotatable manner.

9. The rotating mounting assembly as claimed in claim 8, wherein both the first rod and the second rod are rhomboid in cross-section, and the first bending portion is "<"-shaped in cross-section.

10. The rotating mounting assembly as claimed in claim 8, further comprising:
    a cushion member disposed around the stopper, wherein the cushion member is located between the stopper and the second rod when the stopper abuts the second rod.

11. The rotating mounting assembly as claimed in claim 8, wherein the rotating member is welded to the liquid crystal display, or is mounted on the liquid crystal display by screws.

12. A TV wall comprising:
    a frame;
    a plurality of liquid crystal displays disposed on the frame, and comprises a plurality of screw holes; and
    a plurality of rotating mounting assemblies connecting the liquid crystal displays with the frame, wherein each of the rotating mounting assemblies comprises:
    a base, disposed on the frame, including a plurality of screw holes;
    a hinge, connecting with each of the liquid crystal displays, disposed on the base, wherein the hinge comprises a plurality of through holes corresponding to the screw holes respectively;
    a plurality of screws corresponding to the through holes respectively, wherein the screws are screwed to the screw holes through the through holes so that the hinge is connected with the liquid crystal display.

13. The TV wall as claimed in claim 12, wherein the base is welded to the frame.

14. The TV wall as claimed in claim 12, wherein the hinge is welded to the liquid crystal display.

* * * * *